Feb. 27, 1968 TORAJI NISHIJIMA ET AL 3,371,133
METHOD OF PREPARING NUCLEAR FUEL PELLETS
Filed March 31, 1965  2 Sheets-Sheet 1

United States Patent Office 3,371,133
Patented Feb. 27, 1968

3,371,133
METHOD OF PREPARING NUCLEAR FUEL PELLETS
Toraji Nishijima, Yokohama-shi, Eiji Fukushima, Kawasaki-shi, Akira Ishihata, Tokyo, Takashi Wada and Toshiyuki Kawada, Kawasaki-shi, and Haruya Kitagawa, Tokyo, Japan, assignors to Nippon Atomic Industry Group Co., Ltd., Kawasaki-shi, Japan, a corporation of Japan
Filed Mar. 31, 1965, Ser. No. 444,362
Claims priority, application Japan, Apr. 3, 1964, 39/18,502
4 Claims. (Cl. 264—.5)

ABSTRACT OF THE DISCLOSURE

A method of preparing pellets of oxide nuclear fuel powder characterized by using a roll mill at the step of pulverizing the raw fuel material produced by chemical process. The roll mill has to be used under the condition of limited clearance between two rolls. That is to say, the clearance is to be kept from 0.5 to 1.0 mm. The other conditions of the process are similar to the conventional method.

---

This invention relates to an improved method of preparing nuclear fuel pellets.

Nuclear fuel pellets consisting of $UO_2$, $ThO_2$ or mixture thereof, or comprising as major component, material selected from a group consisting of $UO_2$ and $TiO_2$ and as minor component, material selected from the group consisting of $BeO$, $Nb_2O_5$, $TiO_2$, $Al_2O_3$ and $CaO$ should generally have following characteristics: The nuclear fuel pellets are required to have high density, high dimensional accuracy and uniform internal structure from the standpoint of mechanical strength, ability of preserving fission products, thermal output and safety of the reactor when the pellets are piled up. To fulfill these requirements powders of raw nuclear fuel material are generally press moulded in a predried state, and then sintered to obtain pellets. More particularly, since these nuclear fuel materials generally have extremely high melting points, powder of the raw material is pulverized so that dense sintered pellets may be produced by sintering very fine grain at a temperature within a range of from 1700 to 1800° C. Further, a pressure moulding method of the predry type is utilized for the purpose of attaining a high degree of dimensional accuracy of the final products, and decreasing unrecoverable losses. In order to densely compact the moulded body at a sintering temperature which is lower than the melting point of the raw material, the particle size of raw material powder should be extremely small. Unfortunately coarse grain raw materials are suitable for the pressure moulding of predry type. Accordingly, the problem is: how to coordinate these contradicting characteristics required of the raw material powder.

For this reason a prior art method has been developed wherein the raw material powder is pulverized into fine particles using a ball mill, then a small quantity of a suitable organic binding substance, such as aqueous solution of polyvinyl alcohol or starch, is incorporated with the pulverized particles to form coarse granules, and then the coarse granules are moulded under a high pressure in a predry state. The shaping of the fine particles into secondary coarse granules results in the improvement of the low temperature sintering characteristic and also in the readiness of the predry type pressure moulding.

However, such a process step of finely pulverizing the nuclear fuel substance using a ball mill belongs to the so-called batch system. Such a method is not only inconvenient but also unhealthy since fine particles tend to scatter when they are removed from the ball mill subsequent to pulverization. There are also problems caused by the effect of the secondarily mixed impurities in the nuclear fuel, which may be introduced during said process step by wearing down of balls and mill walls.

It is the object of this invention to provide an improved method of preparing novel nuclear fuel pellets of high density, high purity and high dimensional accuracy as well as uniform internal structure.

Briefly stated, the inventors have found that the following three points are most effective in improving the preparing method.

(1) Roll milling process instead of ball milling was employed for the comminution of raw granules. Impurities introduced during the course were negligible, and sinterability of powder was promoted owing to the unique size distribution produced.

(2) Suitable organic additives and suitable treating means were chosen to get stable pellets without change in weight with time. This was one of the essential factors to get high precision of green density.

(3) Special mechanisms of controlling powders from a hopper to a feeding shoe, and from the shoe to die holes were inserted in an automatic pressing machine.

Further objects and advantages of the present invention will become apparent, and this invention will be better understood from the following description, reference being made to the accompanying drawings. The features of novelty which characterize the invention are set forth in the claims annexed to and forming part of the specification.

Figure 1A:
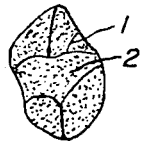
FIGS. 1a and 1b illustrate enlarged diagrammatic views of different types of nuclear fuel powder which has been chemically treated, according to a photograph made with an electron microscope.
Figure 1B:

As the results of extensive research, the inventors have found that, when examined under an electron microscope, oxide nuclear fuel powders, which have been chemically purified, present two types of material, viz, in one type a single particle contains interfaces 1 between several crystals 2, as shown in FIG. 1a, whereas in the other type numerous primary fine particles 3 are agglomerated in a single mass of almost the same size and configuration, as shown in FIG. 1b. It was also found that powders comprising the agglomeration of the primary fine particles, the size of which was about 0.1 $\mu$, were suitable to be treated by roll milling, but the large and single crystalline powders could not be used as raw material of the preparing method of this invention.

Figure 2:
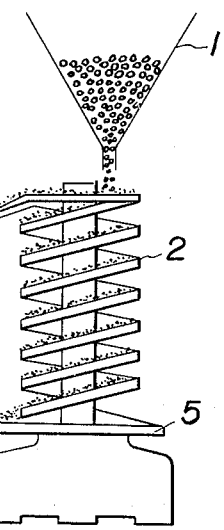
FIG. 2 is a schematic representation of rolling machine and its feeding equipment.

This invention will be described in more detail by referring to FIGS. 2 and 3. Powder of $UO_2$ comprising agglomerated fine particles, as shown in FIG. 1b and prepared by chemical refining with ammonium biuranate method, for example, are rolled by passing them several times between pressure rolls. FIG. 2 illustrates an apparatus of roll-milling and its recycling mechanisms in a hood. Agglomerated powder of $UO_2$ cascades to a spiral vibrating feeder 2 from a hopper 1, and then passes through rotating rollers 3, 3' where it is pulverized. The powder thus pulverized travels to spiral vibrating feeder 2 by means of a vibrator 4 and is selected to a suitable size through a screen 5 provided in the feeder 2. The powder still remaining on the screen 5 is again circulated to the rollers 3, 3' together with a new raw material supplied from the hopper 1. Thus, it is possible to successively obtain $UO_2$ powders of desired particle. Such $UO_2$ powders may also be obtained without the screen 5 by circulating a single charge of the raw material through the spiral vibrating feeder 2 and between the rollers 3 and 3' for several times by the batch system.

Impurities introduced during the course of this comminuting method are negligible, and the operation produces less radioactive dust hazard than other techniques. The rollers 3, 3' for instance with 75 mm. diameter and 150 mm. length are made of tungsten carbide alloy; their clearance is about 0.5 to 1.0 mm.; the number of recycles was 4 to 8 times if batch operation; and these conditions should be appropriately chosen according to the characteristics of starting powder.

Figure 4:
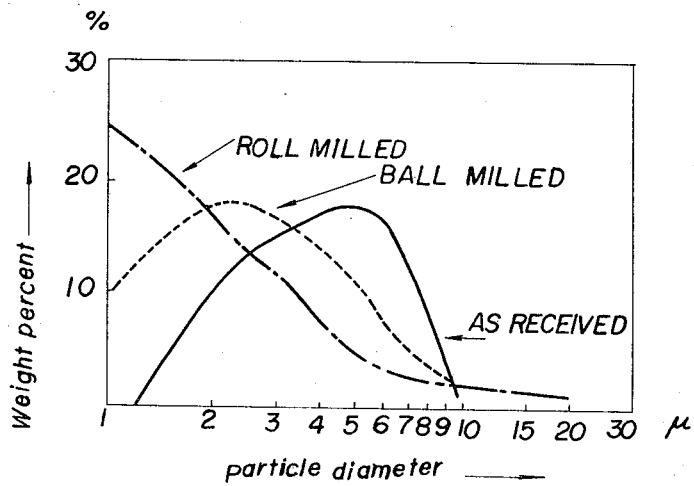
FIG. 4 shows a group of curves to compare the particle size distribution of the nuclear fuel powder prepared in accordance with this invention, with a conventional method and with raw material.

The most unique characteristics of this comminuting method is the particle size distribution produced. In FIG. 4 are shown a typical particle distribution curve of the powder prepared by the above mentioned roll milling method and also a curve of the powder ball-milled for 18 hours in alcohol for comparison. The particle size indicated in FIG. 4 is considered as the size of agglomerates as mentioned before, because the size of elementary particles is observed about 0.1–0.2$\mu$ with the electron microscope. Both fine particles smaller than 1$\mu$ and coarse agglomerates larger than 10$\mu$ are in large concentration in the rolled powder. Because of such a characteristic distribution of particles, a high value of tapped density, a high compressibility and a high sinterability could be attained with the rolled powder as shown in Table 1 and FIG. 5 respectively.

TABLE 1

*Tapped density of the treated powders*

| Kind of powder: | Tapped density, percent of theoretical density |
|---|---|
| UNC reactor grade as received | 20 |
| Ball-milled powder | 24 |
| Roll treated powder | 35 |

Figure 5:
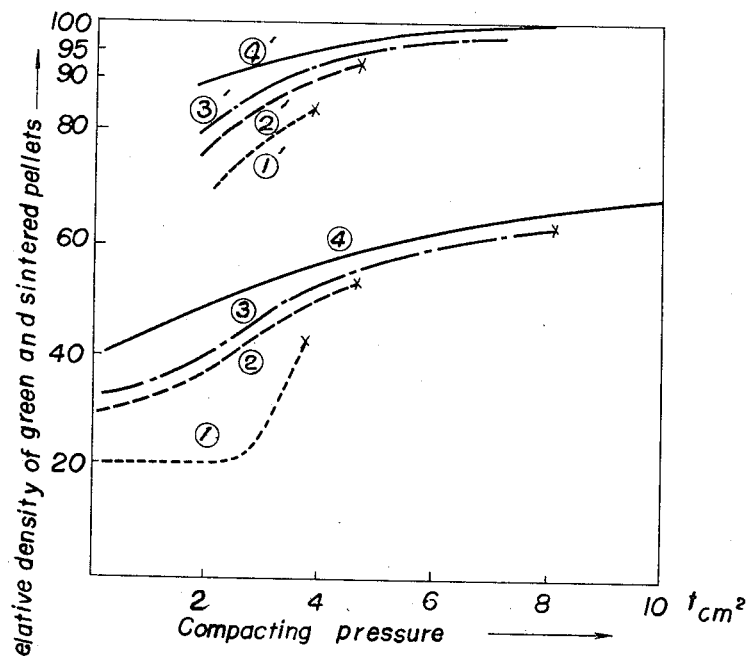
FIG. 5 shows another set of curves to compare the densities of green and sintered pellets effected by various powder treatments on compressibility and sinterability.

In FIG. 5, curve 1 was obtained with unrolled powder without organic binder when pressed; curve 2 was obtained with unrolled powder using the organic binder of this invention; curve 3 was obtained with ball-milled powder with the same organic binder; curve 4 was obtained with rolled powder with the same organic binder; and X marks show crack points happening when pressed. Curves 1', 2', 3' and 4' show the relative density after sintering respectively.

A comparison of impurities in the pellets of roll treated powder and that of generally accepted one is shown in Table 2. It is obvious that the impurities apt to be introduced during comminution treatments are extremely less in the present roll milling method.

TABLE 2

[Impurities included in the pellets]

| Impurities | Conventional Value Generally Accepted, p.p.m. | Actual Impurities Included in Rolled Powder Pellets, p.p.m. |
|---|---|---|
| Al | 50–150 | 20 |
| Cr | 30–100 | 10–15 |
| Cu | 10 | 1–2 |
| Fe | 500 | 20–30 |
| Mg | 100 | 5–10 |
| Mo | 25–100 | <3 |
| Ni | 70–150 | <13 |
| Si | 400–500 | 25–60 |
| Sn | 20 | <5 |
| C | 400 | 25–35 |

The next step of this invention method is mixing a novel organic binder to the rolled powder. Some organic binders are generally used to promote lubricability and compatability of the powder, and there are many binders and many methods of adding them. It is known that uniform mixing can be achieved in the wet state rather than in dry. But when any aqueous solution of organic binder is used, it is unavoidable that the pellets change in weight with time because of water evaporation from the starchy paste.

In this invention method, a carbon tetrachloride solution of paraffin, polyethylene glycol and stearic acid is used as the binder, and 2 to 6 weight percent in total of paraffin (1 to 5 weight percent), polyethylene glycol (1 to 5 weight percent) and stearic acid (0.1 to 3 weight percent are combined with the roll milled powder in carbon tetrachloride solution; the carbon tetrachloride is completely driven off by drying after granulation. The amount of CCl is about 1 litre per 5 kg. $UO_2$ for one example. Paraffin is efficient for lending strength to the green compacts, whereas polyethylene glycol and stearic acid for interval lubrication during pressing.

After the above mentioned mixing, said mixture is partly dried, and then the mixture is formed into coarse granules by any conventional method. For instance, the mixture may be pushed down through any moving screen of suitable mesh. And then the granules are moulded in a press moulding machine.

High precision of green density is obtained with reproducible volumetric die fill on pressing. Once a certain diameter of the die hole has been determined, only the length and the weight of green pellets would be left as the variables for the green density. Four combinations of these variables could be considered as shown in Table 3.

TABLE 3

[Controlling method of green density D in pressing]

| | Length control | Weight control | Characteristics |
|---|---|---|---|
| a | Direct | Gravimetric | Highest precision of D value, lower production rate. |
| b | ...do... | Volumetric | Lower precision of D value, higher production rate. |
| c | Indirect | Gravimetric | Lower precision of D value, lower production rate. |
| d | ...do... | Volumetric | Lowest precision of D value, higher production rate. |

The direct method involves setting a stop or limit switch between the upper and the lower punches to control the length. The indirect method involves the control of oil pressure. The gravimetric method involves feeding powder into the die hole after weighing in every case. The volumetric method utilizes a vibrating action of the die between passes of the feeder shoe on the die. As shown in Table 3, the highest precision of green density could be obtained by method a, but the production rate is the lowest. The production rate increases through use of method d, although precision of the green density becomes the lowest.

Method b of improved style is employed in the method of this invention. In general, the weight of powder fed into the hole volumetrically is influenced by such condition as the depth of the die and vibration cycle of the shoe. But it is the most important that the weight is much influenced by the amount of powder stacked up on the shoe, just as the effect of back pressure. Then it is necessary for the powder amount on the feeder shoe to be kept constant all the time. For this purpose, in the present method, a measuring apparatus and a leveling plate are inserted between feeder shoe and hopper installed beyond the shoe.

Figure 3:
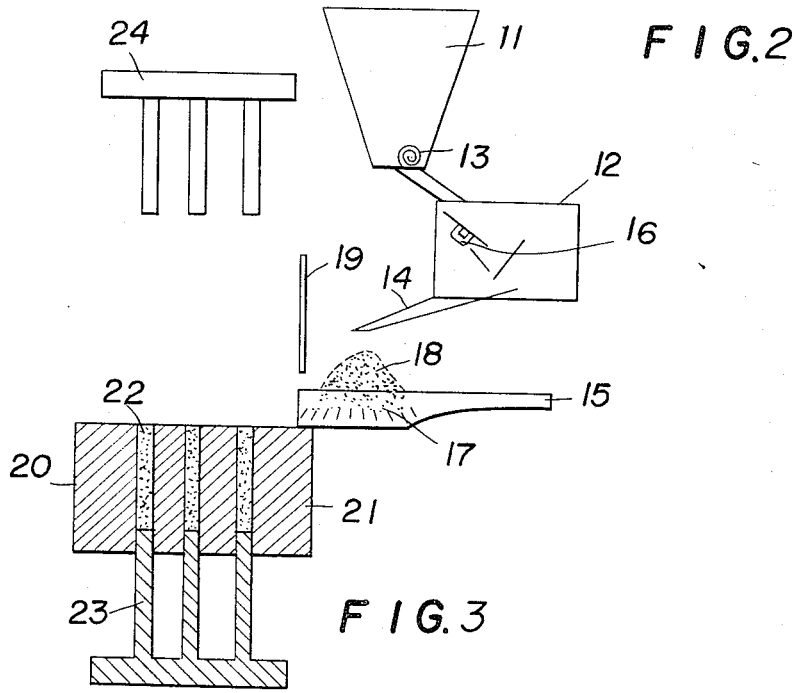
FIG. 3 is a schematic representation of the press moulding procedure of the nuclear fuel powder in accordance with this invention.

The moulding system is schematically illustrated in FIG. 3. An automatic weighing machine 12 is disposed between a hopper 11 acting as a reservoir for the raw material of course granules, and a moulding press 20, supplying the required quantity of the raw material from the hopper 11 onto the automatic weighing machine 12 through a screw feeder 13. The weighed raw material is then automatically supplied through a pipe 14 by the action of a vibrator 16 attached to the automatic weighing machine 12 into a feeder shoe 15 associated with the press 20. It is to be understood that this feeder shoe is constructed to be reciprocated from side to side on the press mould 21. Thus when the feeder shoe 15 is moved on the press mould 21, louver boards 17 in the feeder shoe 15 will supply a quantity of the raw material granules 18 into openings 22 of the mould. At this time the raw material 18 on the feeder shoe 15 is leveled by a leveling plate 19 fitted suitably on the press mould 21, so that the back pressure on the openings 22 is always unified.

In this manner the raw material is automatically weighed and supplied to the press mould, and then moulded according to a volumetric weight control technique. In the drawings, 23 and 24 represent lower and upper punches respectively, to compress the coarse granules contained in the mould openings 22 by a volumetric weight control.

By these ways, accuracy of the green density could rise as high as the precision of $\pm 1.3$ g./cc. even on automatic pressing when a few pellets were pressed simultaneously with one die.

The moulded green pellets are presintered in a nonoxidizing atmosphere to remove the binder, and then subjected to the final sintering treatment similarly in a nonoxidizing atmosphere to obtain oxide nuclear fuel pellets of high density and dimensional accuracy and of uniform internal structure. High yield and low unrecoverable loss could be also attained as a result of these improvements.

During the presintering of green pellets, it is preferable to increase the temperature at a rate of 30 to 40° C. per hour up to about 400° C., and to perform the final sintering operation at a temperature between 1650 and 1750° C. It is to be noted that these sintering operations must be performed in a suitable nonoxidizing atmosphere in order to avoid decrease in the characteristics or workability of the moulded pellets due to oxidation. Heretofore $CO_2$ gas has often been used as an atmospheric gas in presintering. However since the $CO_2$ gas is an oxidizing gas, $UO_2$, for example, is inclined to be transformed to $U_3O_8$ at temperatures above 800° C., thus causing deformation to the pellets. The method of this invention has one of its characteristics to use $N_2$ or $H_2$ gas as the atmospheric gas of presintering and $H_2$ gas as final sintering. More particularly the sintering temperature can be decreased further by sintering the pellets in nitrogen or hydrogen gas atmosphere containing a little amount of steam.

While, in the above embodiment, about the powder of $UO_2$ chemically refined by using ammonium biuranate the description has been done, but so long as the chemically refined particles essentially comprise agglomerated minute particles, any oxide nuclear fuel powder consisting of $UO_2$, $ThO_2$ or mixtures comprising major proportion of $UO_2$ or $ThO_2$ and minor proportion of other ingredients such as $BeO$, $Nb_2O_5$, $Al_2O_3$, $CaO$ or $TiO_2$ may be used in the same manner regardless of their method of preparation.

Thus according to the method of this invention it is able to prepare oxide nuclear fuel pellets of high density and dimensional accuracy as well as uniform internal structure without affecting mouldability and manufacturing efficiency. More particularly, as has been pointed out, powders consisting of agglomerated fine particles can be readily pulverized by roll milling operation, or the agglomerated particles are separated to form individual fine particles. On the other hand some of the agglomerated particles are solidified into denser mass during rolling operation, thus producing powders having appropriate grain size distribution. As will be clear from FIGS. 4 and 5, the roll milling operation according to this invention is very effective to pulverize the raw material powder thus increasing the sintering characteristics of the pellets.

The organic substances in the method of this invention do not scatter during handling and exhibit excellent adhesive and compressive characteristics. The rolling treatment of the raw material powder and suitable selection of the organic substance as a binder contribute to greatly improve the moulding ability and suitability, thus readily providing moulded and sintered pellets of extremely high density. Moreover, in accordance with this invention, since the volume of the coarse granulated raw material to be supplied to the press mould is automatically determined, and since the weight thereof is automatically weighed, it is able to precisely control the dimensions and weight of the moulded product without lowering the manufacturing efficiency. In general, method of controlling the weight by volume is of high efficiency, but it not so accurate, and the method of weighing is accurate but not of high efficiency. However the method of this invention utilizes both volumetric method and weighing method. Thus, the produced pellets after presintering and final sintering operations have constant high density, dimensional accuracy and uniform internal structure with high efficiency. For example, nuclear fuel pellets, prepared and moulded according to the method of this invention, of 10.00 mm. diameter and 15.00 mm. height were measured about their dimensional accuracy and density. It was found that over 96.5% of the product were included in a range of $94.5 \pm 1\%$ with regard to the theoretical density, that over 99% of the product were included in a range of $10.00 \pm 0.10$ mm. diameter, and that over 93.6% were included in a range of $15.00 \pm 0.15$ mm. height. Thus this invention can prepare nuclear fuel pellets having improved density, dimensional accuracy and uniform structure almost without any loss of raw materials. By this reason handling of the oxide nuclear fuel, control of thermal output of the reactor and safety could be greatly improved.

In accordance with the provisions of the patent statutes, we have explained the principle and operation of our invention and have illustrated and described what we consider to represent the best embodiment thereof. However we desire to have it understood that within the scope of the appended claims the invention may be practiced otherwise than as specifically illustrated and described.

What is claimed is:

1. A method of preparing nuclear fuel pellets comprising the steps of roll-milling oxide nuclear fuel powder consisting of agglomerated minute particles, the clearance between rolls being from about 0.5 mm. to about 1 mm. mixing the roll-milled powder with organic binder, predrying the mixture to imperfectly remove the solvent, granulating the predried mixture to get a coarse granular form, drying the granulated mixture perfectly, pressmoulding said dried mixture to get a pellet shape, presintering the green pellets in a non-oxidizing atmosphere to remove the binder and finally sintering the presintering pellets in a non-oxidizing atmosphere.

2. The method of preparing nuclear fuel pellets according to claim 1 wherein said nuclear fuel is selected from a group consisting of $UO_2$, $ThO_2$ and a mixture of $UO_2$ and $ThO_2$.

3. The method of preparing nuclear fuel pellets according to claim 1 wherein said nuclear fuel is selected from a group consisting of $UO_2$, $ThO_2$ and a mixture of $UO_2$ and $ThO_2$, accompanied with a minor proportion of $BeO$, $Nb_2O_5$, $Al_2O_3$, $CaO$ or $TiO_2$.

4. The method of preparing nuclear fuel pellets according to claim 1 wherein said press-moulding is carried out by volumetric weight control accompanied with gravimetric weight control.

References Cited

UNITED STATES PATENTS

| 3,051,566 | 8/1962 | Schwartz | 264—0.5 |
| 3,081,249 | 3/1963 | Whittemore | 264—0.5 |
| 3,121,128 | 2/1964 | O'Leary et al. | 264—0.5 |
| 3,194,852 | 7/1965 | Lloyd et al. | 264—0.5 |

L. DEWAYNE RUTLEDGE, *Primary Examiner.*